US008756178B1

(12) United States Patent
Bruckhaus et al.

(10) Patent No.: US 8,756,178 B1
(45) Date of Patent: Jun. 17, 2014

(54) AUTOMATIC EVENT CATEGORIZATION FOR EVENT TICKET NETWORK SYSTEMS

(75) Inventors: Tilmann Bruckhaus, Cupertino, CA (US); Vipul Sharma, San Jose, CA (US)

(73) Assignee: Eventbrite, Inc., San Francisco, CA (US)

( * ) Notice: Subject to any disclaimer, the term of this patent is extended or adjusted under 35 U.S.C. 154(b) by 252 days.

(21) Appl. No.: 13/278,902

(22) Filed: Oct. 21, 2011

(51) Int. Cl.
*G06F 15/18* (2006.01)
*G06N 3/00* (2006.01)
*G06N 3/12* (2006.01)

(52) U.S. Cl.
USPC .......................................................... 706/13

(58) Field of Classification Search
None
See application file for complete search history.

(56) References Cited

U.S. PATENT DOCUMENTS

| | | | |
|---|---|---|---|
| 7,339,783 B2 | 3/2008 | McEwan | |
| 7,353,279 B2 * | 4/2008 | Durvasula et al. | 709/227 |
| 7,527,195 B2 | 5/2009 | Keithley | |
| 7,607,046 B1 * | 10/2009 | Bruckhaus | 714/38.14 |
| 7,676,449 B2 * | 3/2010 | Baio et al. | 707/781 |
| 8,112,484 B1 * | 2/2012 | Sharma et al. | 709/206 |
| 8,191,141 B2 * | 5/2012 | Suit et al. | 726/23 |
| 8,215,546 B2 | 7/2012 | Lin | |
| 8,301,623 B2 * | 10/2012 | Chakrabarti et al. | 707/723 |
| 8,417,715 B1 * | 4/2013 | Bruckhaus et al. | 707/758 |
| 8,417,783 B1 * | 4/2013 | Sharma et al. | 709/206 |
| 8,489,689 B1 * | 7/2013 | Sharma et al. | 709/206 |
| 8,539,570 B2 * | 9/2013 | Sharma et al. | 726/12 |
| 8,566,941 B2 * | 10/2013 | Suit et al. | 726/23 |
| 8,606,644 B1 * | 12/2013 | Bruckhaus et al. | 705/26.1 |
| 2004/0030739 A1 | 2/2004 | Yousefi'zadeh | |
| 2004/0137882 A1 | 7/2004 | Forsyth | |
| 2006/0100985 A1 | 5/2006 | Mark | |
| 2007/0055554 A1 | 3/2007 | Sussman | |
| 2007/0233708 A1 | 10/2007 | Baio | |
| 2007/0276707 A1 | 11/2007 | Collopy | |
| 2008/0065685 A1 | 3/2008 | Frank | |
| 2009/0094175 A1 | 4/2009 | Provos | |
| 2009/0192853 A1 | 7/2009 | Drake | |
| 2009/0216571 A1 | 8/2009 | Sunshine | |
| 2009/0234659 A1 | 9/2009 | Liao | |
| 2009/0326993 A1 | 12/2009 | Roth | |
| 2010/0082491 A1 | 4/2010 | Rosenblatt | |
| 2010/0091687 A1 | 4/2010 | Beers | |
| 2010/0094791 A1 | 4/2010 | Miltonberger | |
| 2010/0219234 A1 | 9/2010 | Forbes | |
| 2010/0287368 A1 | 11/2010 | Shuster | |
| 2010/0293090 A1 | 11/2010 | Domenikos | |
| 2011/0313870 A1 | 12/2011 | Eicher | |
| 2012/0042392 A1 | 2/2012 | Wu | |
| 2012/0078667 A1 | 3/2012 | Denker | |

(Continued)

OTHER PUBLICATIONS

Vipul Sharma, Presentation on PRISM, available at http://prezi.com/jbk_avwkl7kv/prism/, 26 pages, Oct. 29, 2010.

(Continued)

*Primary Examiner* — Michael B Holmes
(74) *Attorney, Agent, or Firm* — Baker Botts L.L.P.

(57) ABSTRACT

In one embodiment, a method includes accessing event information associated with an event listing, calculating one or more category probabilities for the event listing based in part on the event information associated with the event listing using one or more categorization models, and associating with the event listing the category corresponding to the category probability for each category probability greater than or equal to a threshold probability.

20 Claims, 4 Drawing Sheets

(56) References Cited

U.S. PATENT DOCUMENTS

2012/0197749 A1    8/2012    Gray
2012/0203698 A1    8/2012    Duncan
2012/0330697 A1    12/2012    Smith

OTHER PUBLICATIONS

Wikipedia, TF-IDF, available at http://en.wikipedia.org/wiki/Tf%E2%80%93idf, 4 pages, printed Jul. 13, 2011.

* cited by examiner

AUTOMATIC EVENT CATEGORIZATION FOR EVENT TICKET NETWORK SYSTEMS

TECHNICAL FIELD

The present disclosure generally relates to online event management systems, and in particular categorizing events on such systems.

BACKGROUND

Many websites allow users to conduct a variety of actions online, such as view content, write reviews, order items, purchase tickets, etc. These websites often present the user with a plurality of actions to choose from and allow the user to select the type of action he would like to perform. Once the action is selected, the website typically redirects the client system of the user to a webpage where the action can be completed. For example, some websites allow users to organize events using an online event management system. An online event management system may allow an event organizer to organize and manage various aspects of an event, such as, for example, managing attendee registrations and selling tickets, promoting the event, and managing attendee check-in at the event. An online event management system may also allow users to view event listings, register for events, and purchase tickets for events. Online systems, such as online event management systems, can typically be accessed using suitable browser clients (e.g., Firefox, Chrome, Internet Explorer).

One problem for online event management systems is the categorization of events. Owners of event management systems may wish to categorize events in order to facilitate, for example, business analysis, search functionality, or customer satisfaction. Online event management systems may process tens of thousands of events, and it can be prohibitively expensive and time consuming to manually categorize each event.

DESCRIPTION OF EXAMPLE EMBODIMENTS

System Overview

Figure 1:
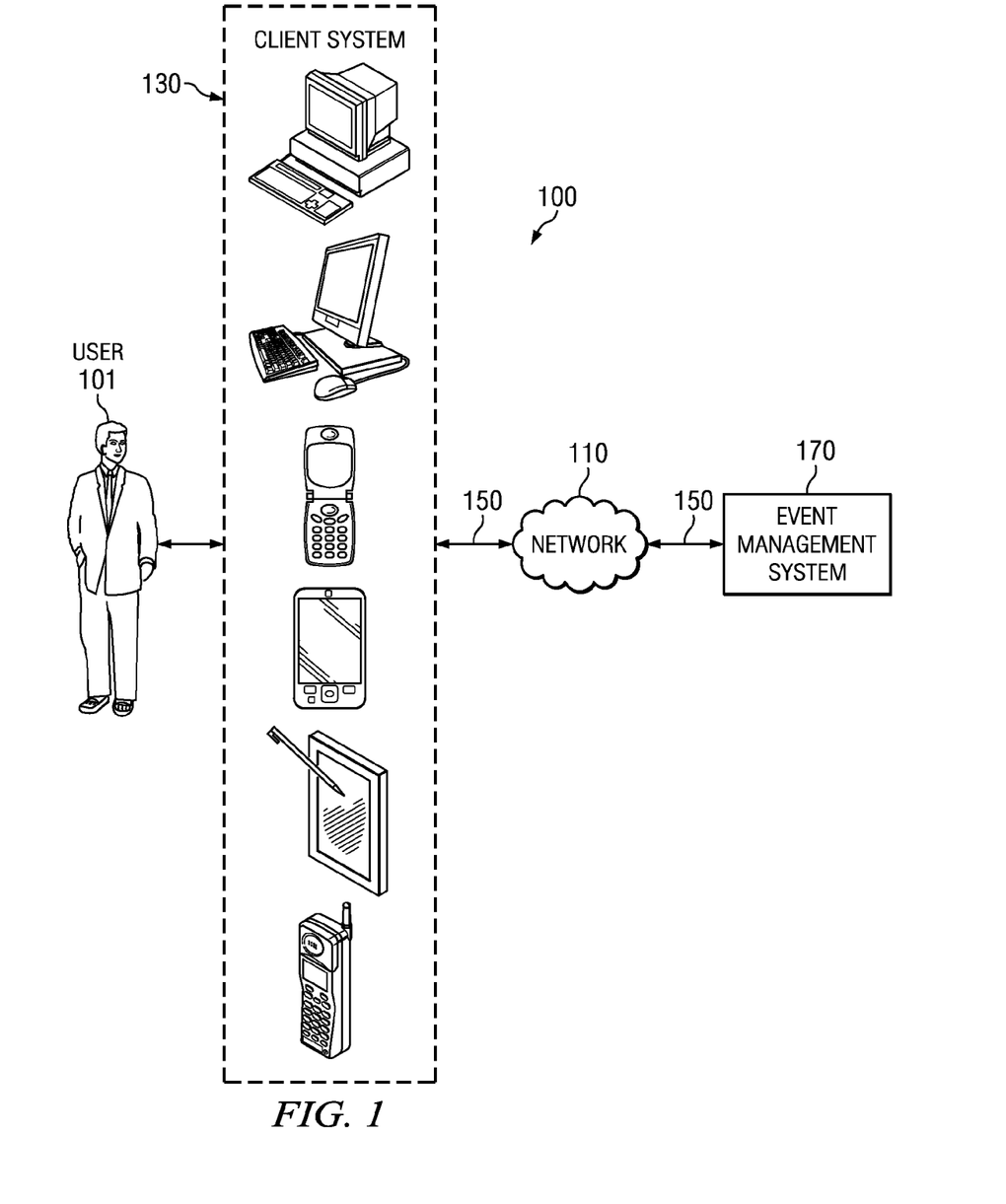
FIG. 1 illustrates an example system for implementing an online event management system.

FIG. 1 illustrates an example system 100 for implementing an online event management system. System 100 includes a user 101, a client system 130, and an event management system 170 connected to each other by a network 110. Although FIG. 1 illustrates a particular arrangement of user 101, client system 130, event management system 170, and network 110, this disclosure contemplates any suitable arrangement of user 101, client system 130, event management system 170, and network 110. As an example and not by way of limitation, two or more of client system 130 and event management system 170 may be connected to each other directly, bypassing network 110. As another example and not by way of limitation, two or more of client system 130 and event management system 170 may be physically or logically co-located with each other in whole or in part. Moreover, although FIG. 1 illustrates a particular number of users 101, client system 130, event management systems 170, and networks 110, this disclosure contemplates any suitable number of users 101, client systems 130, event management systems 170, and networks 110. As an example and not by way of limitation, system 100 may include multiple users 101, client systems 130, event management systems 170, and networks 110.

In particular embodiments, an event management system 170 may be a network-addressable computing system that can host one or more event organization and management systems. An event management system 170 may generate, store, receive, or transmit event-related data, such as, for example, event listings, event information details, event history details, event registration details, event organizer details, event attendee details, ticket purchase details, attendee check-in details, or event displays. An event management system 170 may be accessed by the other components of system 100, either directly or via network 110. In particular embodiments, one or more users 101 may use one or more client systems 130 to access, send data to, and receive data from an event management system 170. A client system 130 may access an event management system 170 directly, via network 110, or via a third-party system. A client system 130 may be any suitable computing device, such as, for example, a personal computer, a laptop, a cellular phone, a smartphone, a personal digital assistant, an ultra-mobile PC, or a computing tablet.

Network 110 may be any suitable communications network. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another suitable network, or a combination of two or more of these. Network 110 may include one or more networks 110.

Connections 150 may connect client system 130 and event management system 170 to communication network 110 or to each other. This disclosure contemplates any suitable connections 150. In particular embodiments, one or more connections 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)) or optical (such as for example Synchronous Optical Network (SONET) or Synchronous Digital Hierarchy (SDH)) connections. In particular embodiments, one or more connections 150 each include an ad hoc network, an intranet, an extranet, a VPN, a LAN, a WLAN, a WAN, a WWAN, a MAN, a portion of the Internet, a portion of the PSTN, a cellular telephone network, another suitable connection 150, or a combination of two or more such connections 150. Connections 150 need not necessarily be the same throughout system 100. One or more first connections 150 may differ in one or more respects from one or more second connections 150.

Event Management Systems

In particular embodiments, an event management system 170 may allow users to organize and manage events. An event may be, for example, a party, a concert, a conference, a sporting event, a fundraiser, a networking event, or a live performance. Events may occur online (such as, for example, a web-based seminar) and offline (such as, for example, a live seminar in a lecture hall). An event management system 170 may allow an event organizer to organize and manage various aspects of an event, such as, for example, managing attendee registrations and selling tickets, managing funds from ticket sales, promoting the event, and managing attendee check-in at the event. An event management system 170 may also allow event attendees to view and manage various aspects of registering for an event, such as, for example, viewing event listings, viewing event information, viewing event history information, registering for events, and purchasing tickets for events. As an example and not by way of limitation, a first user may use event management system 170 to organize an event. The first user may input event information associated with the event. One or more second users may then use event management system 170 to register for the event. The second users may view an event listing associated with the event and then purchase tickets for the event. Although this disclosure describes particular types of events, this disclosure contemplates any suitable types of events. Moreover, although this disclosure describes organizing and managing particular aspects of an event, this disclosure contemplates organizing and managing any suitable aspects of an event.

In particular embodiments, an event management system 170 may have an event listing associated with each event managed by the system. An event listing may be hosted on event management system 170, such as, for example, on a particular webpage associated with the event listing. An event listing may be accessed and displayed by any suitable client system 130, such as, for example, by accessing the particular webpage associated with the event listing. An event listing may have an event information associated with the event listing. Event information may include, for example, information describing the event date, type, cost, organizer, promoter, geographic location, venue, performer, tickets, number of tickets available for the event, type of tickets available for the event, ticket identifiers, attendees, attendee check-in status, or other suitable event information. Although this disclosure describes particular types of event information, this disclosure contemplates any suitable types of event information.

In particular embodiments, the event information associated with an event listing may include an event attendee list. The event attendee list may include, for example, information describing one or more of the attendees registered to attend the event, include the attendee's name, phone number, mailing address, email address, payment information, ticket order information, ticket information, check-in status, and other suitable attendee information. Each attendee may be assigned one or more tickets, and each ticket may have a unique ticket identifier. A ticket identifier may be an identification number, a barcode, a 2D barcode, a QR code, or another suitable unique identifier. Although this disclosure describes particular types of information associated with an event attendee list, this disclosure contemplates any suitable types of information associated with an event attendee list.

In particular embodiments, the event information associated with an event listing may include a total number and type of tickets that are available for the event. The type of tickets available for an event may include, for example, premium tickets, general admission tickets, reserved seating tickets, another suitable type of tickets, or two or more such types of tickets. There may be various numbers of each ticket type available for the event. The number of tickets available for an event may be based on a variety of factors. As an example and not by way of limitation, the event organizer or venue owner may specify a particular number of tickets that may be sold for the event. As an example and not by way of limitations, the number of tickets that may be sold may be based on the size or capacity of the venue. Although this disclosure describes particular numbers and types of tickets that are available for an event, this disclosure contemplates any suitable numbers and types of tickets that are available for an event.

In particular embodiments, a client system 130 may access purchase information corresponding to an order. A purchase information may include, for example, an attendee's name, phone number, mailing address, email address, billing address, payment information, ticket order information, or other suitable purchase information. Payment information may include, for example, credit card information, bank account number, PayPal username, cash payment information, money transfer information, address verification system score for the payment, validity information for the payment, or other suitable payment information. Although this disclosure describes particular types of purchase information and payment information, this disclosure contemplates any suitable types of purchase information and payment information.

In particular embodiments, each user 101 of event management system 170 may have an event history information associated with the user 101. Event history information may include event information and payment information associated with one or more events a user 101 has attended or has registered to attend, as well as purchase history information associated with each event. Event history information may also include event information associated with one or more event listings a user 101 has created, organized, and managed. Although this disclosure describes particular event history information, this disclosure contemplates any suitable event history information.

In particular embodiments, the event management system 170 may use a unique client identifier (ID) to identify a user 101. As an example and not by way of limitation, the event management system 170 may assign a unique client identifier to each client system 130. The event management system 170 may assign each client system 130 with an unique client identifier based on the IP address of the client system 130, tracking cookies on the client system 130 (which may be appended to HTTP requests transmitted by the client system 130), the serial number or asset tag of the client system 130, or other suitable identifying information. As another example and not by way of limitation, the event management system 170 may assign a unique client identifier to each user 101, which the user may provide to the event management system 170 via a client system 130. The event management system 170 may assign each user 101 with a username and password that the user 101 can input into client system 130, which then transmits the username and password to the event management system 170. In particular embodiments, the event management system 170 can use the unique client identifier to determine that the user 101 is accessing the system. As yet another example and not by way of limitation, the event management system 170 may assign a unique client identifier to each attendee of an event.

In particular embodiments, the event management system 170 may maintain an event management account for a user 101. The event management account may contain a variety of information about the user 101. As an example and not by way of limitation, an event management account may contain personal information (such as, for example, name, sex, location, interests), social network information (such as, for example, friend connections, personal information about user 101's friends), financial information (such as, for example, income, credit history), event history information (such as, for example, the type, data, cost, venue, performers, geographic location of the events a user 101 has organize, registered for, or attended), and other suitable information related to the user 101. Although this disclosure describes event management accounts containing particular types of information about a user 101, this disclosure contemplates event management accounts containing any suitable information about a user 101.

In particular embodiments, an event management system 170 may use a "shopping cart" model to facilitate event registration. As an example and not by way of limitation, event management system 170 may present a user 101 with a plurality of event listings. The user 101 may select one or more of the events to register for. When the user 101 selects an event listing on event management system 170, the event management system 170 may metaphorically add that item (e.g., registration for the event) to a shopping cart. When the user 101 is done selecting event listings, then all the items in the shopping cart may be "checked out" (i.e., ordered) when the user 101 provides payment information (and possibly shipment information). In some embodiments, when a user 101 selects an event listing, then that event listing may be "checked out" by automatically prompting the user for purchase information, such as, for example, the user's name and payment information. The user 101 then may be presented with a registration webpage that prompts the user for the user-specific registration information to complete the registration. That webpage may be prefilled with information that was provided by the user 101 when registering for another event or when establishing a user account on event management system 170. The information may then be validated by event management system 170, and the registration may be completed. At this point, the user 101 may be presented with a registration confirmation webpage or a receipt that displays the details of the event and registration details. Event management system 170 may also charge or withdraw funds from a financial account associated with user 101 based on the payment information provided by the user 101. The "shopping cart" model may be facilitated by a client system 130 operating offline from event management system 170. Although this disclosure describes particular means for registering for events and purchasing tickets, this disclosure contemplates any suitable means for registering for events and purchasing tickets.

Creating Event Listings

Figure 2:
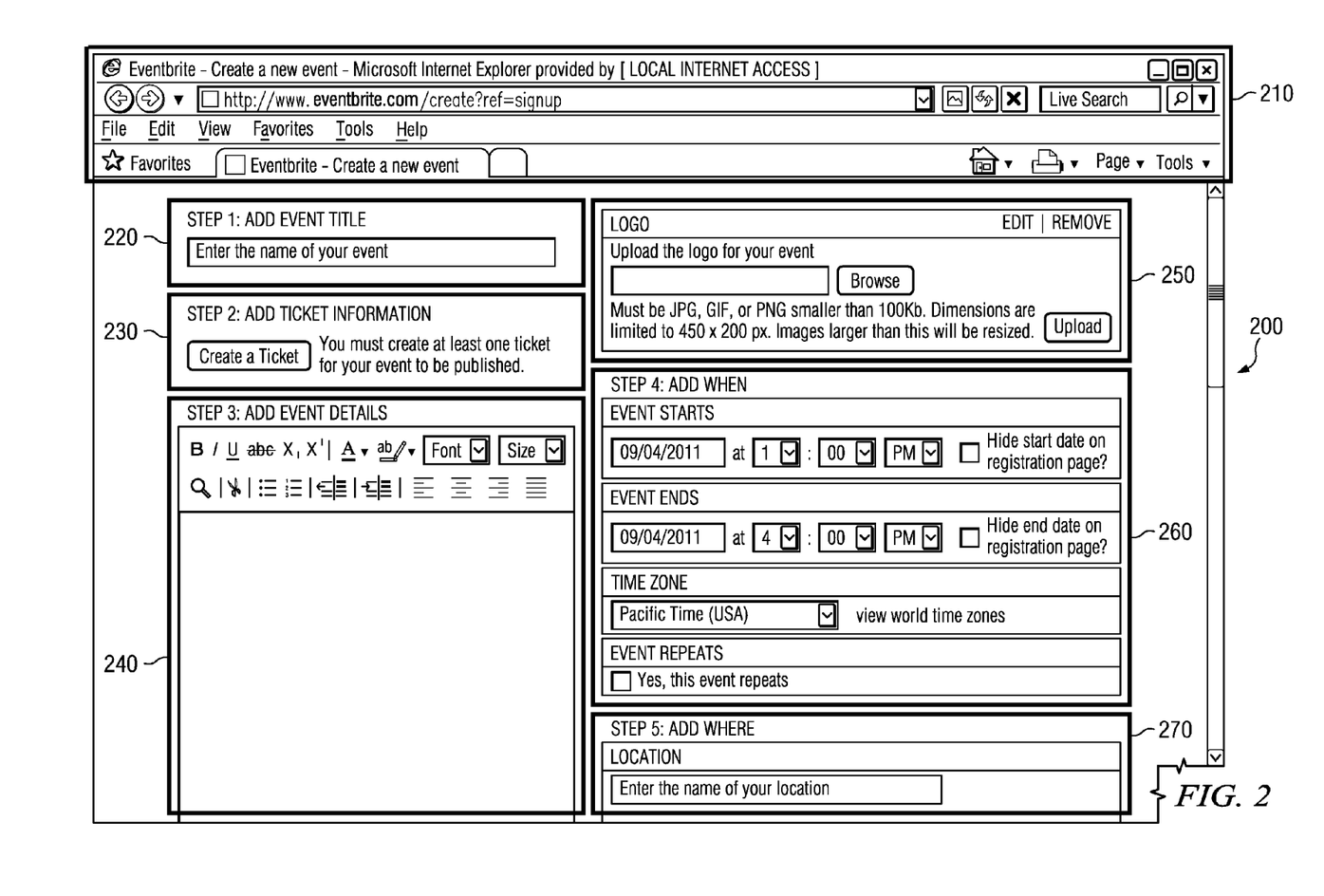
FIG. 2 illustrates an example webpage for creating an event listing.

FIG. 2 illustrates an example webpage 200 for creating an event listing on an event management system 170. In particular embodiments, event management system 170 may host a webpage that a user 101 may use to input event information, event organizer information, attendee information, or other suitable information in order to create an event listing. The webpage 200 illustrated in FIG. 2 may be automatically generated and presented to a user 101 in response to the user 101 visiting or accessing a website hosted by an event management system 170. The webpage 200 may be accessed by a client system 130 with a suitable browser client 210. This example webpage contains fields 220, 230, 240, 250, 260, and 270 for an event organizer to input event information to be associated with the event listing. Although this disclosure describes creating an event listing in a particular manner, this disclosure contemplates creating an event listing in any suitable manner. Moreover, although this disclosure describes creating an event listing using particular components, this disclosure contemplates creating an event listing using any suitable components.

In particular embodiments, an event organizer may input particular event information into the fields contained on webpage 200. As an example and not by way of limitation, an event organizer may input an event title in field 220, ticket information for the event in field 230, a detailed description of the event or particular details associated with the event in field 240, an image or logo to be associated with the event listing in field 250, a date or time for the event in field 260, or a location for the event in field 270. Although this disclosure describes creating an event listing with particular event information, this disclosure contemplates creating an event listing with any suitable event information. As an example and not by way of limitation, additional event information may include quantity of tickets, quantity of tickets remaining, event categories, previous events at the same venue, previous events put on by the event organizer, additional images or logos, links to vendor websites, or other suitable event information. Moreover, although this disclosure describes creating an event listing using particular components, this disclosure contemplates creating an event listing using any suitable components.

Categorizing Events

In particular embodiments, an event management system 170 may evaluate an event listing to a category for the event associated with the event listing. The event management system 170 may access event listings for events and associated event information or payment information and analyze the event listings to determine one or more categories for the events. Existing systems that allow the event organizer to select the event category may be inaccurate or not match the categories that the event management system owners would associate with the event. Furthermore, existing automatic event categorization systems that operate via a simple textual analysis may improperly categorize events by giving certain terms improper weight. Although this disclosure describes particular methods for categorizing event listings, this disclosure contemplates any suitable methods for categorizing event listings. Moreover, although this disclosure describes using particular components to categorize event listings, this disclosure contemplates using any suitable components to categorize event listings.

In particular embodiments, an event management system 170 may identify features associated with particular event listings. The features may be derived from an analysis of one or more previous event listings. A feature is an attribute that characterizes the event information associated with an event listing. As an example and not by way of limitation, features may be words, phrases, domains, compounds, rules, user-identified categories, user identifications, usernames, metadata, a combination of two or more such features, or other suitable attributes. For example, a word feature may be the word "pizza," a phrase feature may be "learn to cook," a domain feature may be a link to "www.makepizza.com," a compound feature may be a boolean combination of "word=pizza & username=PizzaChef14," a user-identified category may be "cooking classes," or a metadata feature may be user "PizzaChef14's" previous event listings and website interactions. In particular embodiments, an event information for an event may contain information relating to the location of the event that may be identified as a feature. As an example and not by way of limitation, the event title, detailed description of the event, image or logo associate with the event listing, date or time of the event, or location of the event from the event information may provide information relating to the location of the event. In particular embodiments, a feature may be the event history of an event organizer, including the events they have created and attended. As an example and not by way of limitation, if an event organizer has previously created several "music" events, a feature may be a rule that events created by the event organizer will have a higher probability of being designated as "music." In particular embodiments, a feature may be the event preference and attendances of the event organizers online friends. In particular embodiments, a set of features may be generated by analyzing previous event listings and manually selecting portions of event informations to correspond to features. As an example and not by way of limitation, a user 101 may access an event listing where the title is "Dungeons & Dragons Winter Convention." The user 101 may then manually identify "Dungeons & Dragons," "Winter," and "Convention" as three separate features. The set of features may be also be generated automatically, such as, for example, by using a frequency algorithm such as term-frequency-inverse-document-frequency (tf-idf), or another suitable analytical technique. In particular embodiments, an event management system 170 may update the set of features at particular times. The set of features may be updated in real-time or post-facto. As an example and not by way of limitation, an event management system 170 may update a set of features each time an event listing is created by an event organizer. As another example and not by way of limitation, an event management system 170 may update the set of features when the event organizer makes an update or change to the event information associated with an event listing. As yet another example and not by way of limitation, event management system 170 may update a set of features periodically, such as every ten minutes, every hour, every day, or at another suitable period. In particular embodiments, features may be given context. As an example and not by way of limitation, context may include information describing the types of events or categories that particular features are typically associated with, or determining the meaning of an ambiguous word from surrounding features. As an example and not by way of limitation, the word "startup" may be a word feature that has a high probability of corresponding to entrepreneurial business when other features such as the phrases "investment opportunity" or "market niche" are present in the event information. Although this disclosure describes identifying features and generating sets of features in a particular manner, this disclosure contemplates any suitable methods for identifying features and generating sets of features. Moreover, although this disclosure describes using particular components to generate sets of features, this disclosure contemplates using any suitable components to generate sets of features.

In particular embodiments, an event management system 170 may identify features based at least in part on term-frequency-inverse-document-frequency (tf-idf) of one or more words (or terms) in the event information associated with the event listing. The tf-idf is a statistical measure used to evaluate how important a word is to a document in a collection or corpus. The importance increases proportionally to the number of times a word appears in a particular document, but is offset by the frequency of the word in the corpus of documents. The term count in a document is simply the number of times a given term appears in the document. This count may be normalized to prevent a bias towards longer documents (which may have a higher term count regardless of the actual importance of that term in the document) and to give a measure of the importance of the term t within the particular document d. Thus we have the term frequency tf(t,d), defined in the simplest case as the occurrence count of a term in a document. The inverse-document frequency (idf) is a measure of the general importance of the term which is obtained by dividing the total number of documents by the number of documents containing the term, and then taking the logarithm of that quotient. A high weight in tf-idf is reached by a high term frequency in the given document and a low document frequency of the term in the whole collection of documents; the weights hence tend to filter out common terms.

In particular embodiments, event management system 170 may generate a set of features based at least in part on term-frequency-inverse-document-frequency (tf-idf). The following is an example algorithm that an event management system 170 could use to calculate a tf-idf value for a particular event information:

$$(tf\text{-}idf)_{i,j} = tf_{i,j} \times idf_i$$

where:

$$tf_{i,j} = \frac{n_{i,j}}{\sum_k n_{k,j}}, \text{ and } idf_i = \log \frac{|D|}{|\{d : t_i \in d\}|}$$

and where:
- $(tf\text{-}idf)_{i,j}$ is the term-frequency-inverse-document-frequency,
- $tf_{i,j}$ is the term frequency of term i in document j,
- $idf_i$ is the inverse document frequency of term i,
- $n_{i,j}$ is the number of times term i appears in document j,
- k is the total number of terms,
- D is the total number of documents, and
- d is the current document.

Although this disclosure describes generating a set of features using a particular algorithm, this disclosure contemplates generating a set of features using any suitable algorithm. Moreover, although this disclosure describes generating a set of features using particular variables that represent particular information, this disclosure contemplates generating a set of features using any suitable variables representing any suitable information.

In particular embodiments, an event management system 170 may apply an event categorization model to categorize an event listing. An event categorization model may calculate the probability that event information associated with an event listing corresponds to a given event category. An event categorization model may compare a set of features from an event listing with a set of features typically associated with a particular category to determine the probability that the event listing is associated with that category. As an example and not by way of limitation, one or more event categorization models may calculate that based on a given set of features in an event listing, the event listing has a 22% probability of being associated with the "food" category and a 74% probability of being associated with the "conference" category. Although this disclosure describes categorizing event listings in a particular manner, this disclosure contemplates categorizing event listings in any suitable manner.

In particular embodiments, an event management system 170 may generate an event categorization model using supervised learning to generate a mathematical model or function from control data. A model is a means for describing a system or object. As an example and not by way of limitation, a model may be a data set, function, algorithm, differential equation, chart, table, decision tree, simulation, another suitable model, or two or more such models. A model may describe a variety of systems or objects. A mathematical model may be created for each desired category to represent a set of control event listings, and this model may later be used to classify an event listing. In particular embodiments, the set of control event listings may consist of existing event data and manually selected categories. As an example and not by way of limitation, an event management system 170 may access a set of control event listings that have been manually categorized as "food" events. The event management system 170 may then analyze the features of these event listings to determine what features are associated with food event listings (such as, for example, words like "food," "eat," "drink," or "cook"). A model may then be created based on the identified features in the set of control event listings. This model may then be used to categorize other event listings that are not yet associated with a particular category (e.g., newly created event listings) to determine the probability that these other event listings are food events. In particular embodiments, the set of control event listings may be analyzed using logistic regression, binary classification, multiclass classification, or maximum likelihood estimation to refine the categorization model. In particular embodiments, the accuracy of the categorization model may be verified. As an example and not by way of limitation, the validity of a categorization model may be estimated by cross validation to prevent overfitting. In particular embodiments, the validity of a categorization model may be periodically evaluated to ensure that event listings are automatically categorized correctly. As an example and not by way of limitation, event listings may be randomly selected and manually verified to ensure that a categorization model is properly categorizing event listings. Although this disclosure describes generating a categorization model in a particular manner, this disclosure contemplates generating a categorization model in any suitable manner.

In particular embodiments, an event management system 170 may use one or more event categorization models to automatically categorize events or event listings. The following is an example algorithm that an event management system 170 could use to automatically categorize an event or event listing:

$$f_c(z) = 1/1 + e^{-z}$$

where:

f (z) is the probability of an event listing being associated with a category c given a particular set of features associated with the event listing; and $z = \beta_0 + \beta_1 x_1 + \beta_2 x_2 + \ldots + \beta_k x_k$, where z is the result of a comparison between a set of features associated with the event listing and the weights associated with those features;

and where:

β is a factor associated with a particular feature, where β for each feature may be calculated using the above described supervised learning algorithms such as logistic regression for a set of control event listings; and x is a measure of a feature value for a given event listing, there the feature value may be an indication of the association of, lack of association of, or frequency of a feature in the event listing.

In particular embodiments, each factor β may be calculated using logistic regression on a set of control event listings, where both x and $f_c(z)$ are known for the control event listings. Following the determination of the factors β for a particular category c, $f_c(z)$ may be calculated for event listings where only x is known. x may indicate, for example, the strength of association of a feature with an event listing, the lack of association of a feature with an event listing, or the frequency that the feature appears in the event listing. Although this disclosure describes automatically categorizing events using a particular algorithm, this disclosure contemplates automatically categorizing events using any suitable algorithm. Moreover, although this disclosure describes a categorization model using particular variables that represent particular event information, this disclosure contemplates a categorization model using any suitable variables representing any suitable event information.

In particular embodiments, an event management system 170 may access event information associated with an event listing to facilitate categorization of the event or event listing. As an example and not by way of limitation, each time an event management system 170 receives a new event listing, the event management system 170 may access the event information associated with the event listing in order to determine a category to associate with the event listing. In particular embodiments, the event management system 170 may store the event information associated with an event listing for later automatic categorization, or it may automatically categorize the new event synchronously with receiving the event listing. Although this disclosure contemplates accessing event information associated with an event listing in a particular manner, this disclosure contemplates accessing event information associated with an event listing in any suitable manner.

In particular embodiments, an event management system 170 may access a list (or set) comprising a plurality of features. The list of features may include features previously determined by analyzing other event listings. As an example and not by way of limitation the list of features may comprise a list of features found in all previous event listings. In particular embodiments, an event management system 170 may access a list of features remotely or the list of features may be stored locally on the event management system 170. Although this disclosure describes accessing a list comprising a plurality of features in a particular manner, this disclosure contemplates accessing a list features in any suitable manner.

In particular embodiments, an event management system 170 may compare a list comprising a plurality of features to the event information associated with an event listing. As an example and not by way of limitation, the event management system 170 may compare the event information with the list of features to determine the value of each feature in an event listing based on the event information, such as, for example, what features and how many of each feature from the list are present in the event information. If a feature is not present in an event listing, a value of zero may be calculated for that feature. In particular embodiments, the event management system 170 may create a record of the features associated with the event listing. As an example and not by way of limitation, event management system 170 may generate a matrix, a sparse matrix, or other suitable data structure indicating the value of each feature in the feature list that is associated with the event listing. As another example and not by way of limitation, a comparison may report that an event information contains particular values of the features "music," "guitar lessons," and a picture of a man playing a guitar. The comparison may also indicate as a feature whether the event organizer has previously created events for "piano lessons" and "voice lessons." The event management system 170 may then determine that certain values of these features are associated with a high probability that the event listing is in the "music" category. Although this disclosure describes comparing a list comprising a plurality of features with event information associated with an event listing in a particular manner, this disclosure contemplates comparing a list comprising a plurality of features with event information associated with an event in any suitable manner.

In particular embodiments, an event management system 170 may calculate one or more category probabilities for an event listing using one or more categorization models. Each categorization model may calculate a category probability based at least in part on the event information associated with the event listing. As an example and not by way of limitation, each categorization model may include one or more variables based on a preset list of one of more features, the presence or frequency of one or more features being associated with the event listing, the absence of one or more features being associated with the event listing, or other suitable inputs. In particular embodiments, each categorization model may calculate a probability corresponding to a particular category, and the category probability may correspond to the probability that an event listing falls within the category. As an example and not by way of limitation, one categorization model may calculate the probability that an event listing is a "food" event, while another categorization model may calculate the probability that an event is a "conference" event. The event management system 170 may calculate a category probability for an event listing using a plurality of categorization models in sequence or in parallel. In particular embodiments, the category probability for the event listing may be a percentile rank equal to the percentage of event listings that have a category probability the same or lower than the event listing. As an example and not by way of limitation, an event listing may be classified as having a 23% probability of being a "food" event, as having a 55% probability of being a "conference" event and as having a 94% probability of being an "art" event. In particular embodiments, the event management system may calculate the probability of an event listing being associated with a category c using the algorithm $f_c(z)=1/1+e^{-z}$. Certain features from a feature list may be given more or less weight by the categorization model when calculating a particular event category more than other categories, and event listings that are associated with these features may thus have a higher probability of being associated with that event category. As an example and not by way of limitation, a categorization model that calculates the probability of an event listing being a "food" event may assign high β value to the feature "cooking class" but a categorization model that calculates the probability of an event listing being a "music" event may assign a low β value to the feature "cooking class." Thus, the product of β and x for the feature "cooking class" would be high for c="food" but lower (or possibly zero) for c="music." As another example and not by way of limitation, a categorization model that calculates the probability that an event listing is associated with a "food" category may give a high weight to features such as "pizza," "cooking," "tasting," a location at a restaurant, or a picture of pie, but may give a low or no weight to features such as "music," "transmission fluid," "Demogorgon," a picture of a video game console, or a location in a cinema. As another example and not by way of limitation, a categorization model may assign more weight to particular types of features, such as, for example, by assigning a high weight to features associated with user-identified categories, but assigning a lower weight to features associated with images. In particular embodiments, the event management system 170 may, for each category probability greater than or equal to a threshold probability, associate with the event listing the category corresponding to the category probability. As an example and not by way of limitation, the event management system 170 may only associate a category with an event listing if that event listing has a category probability over 65%. In particular embodiments, the threshold probability may be different for different categories. As an example and not by way of limitation, a "food" category may require a 65% probability to be associated with an event, while a "business" category may only require a 50% probability to be associated with an event. In particular embodiments, event management system 170 may store a category associated with an event listing as data in a data store, for example, by modifying the event listing data or by creating a new data file that is associated with the event listing. In particular embodiments, the event management system 170 may display one or more of the categories associated with the event listing to a user 101. Although this disclosure describes calculating one or more category probabilities for an event listing using one or more categorization models in a particular manner, this disclosure contemplates calculating one or more category probabilities for an event listing using one or more categorization models in any suitable manner. Moreover, although this disclosure describes particular features or categories as inputs and results to a categorization model, this disclosure contemplates any suitable inputs and results to a categorization model.

Figure 3:
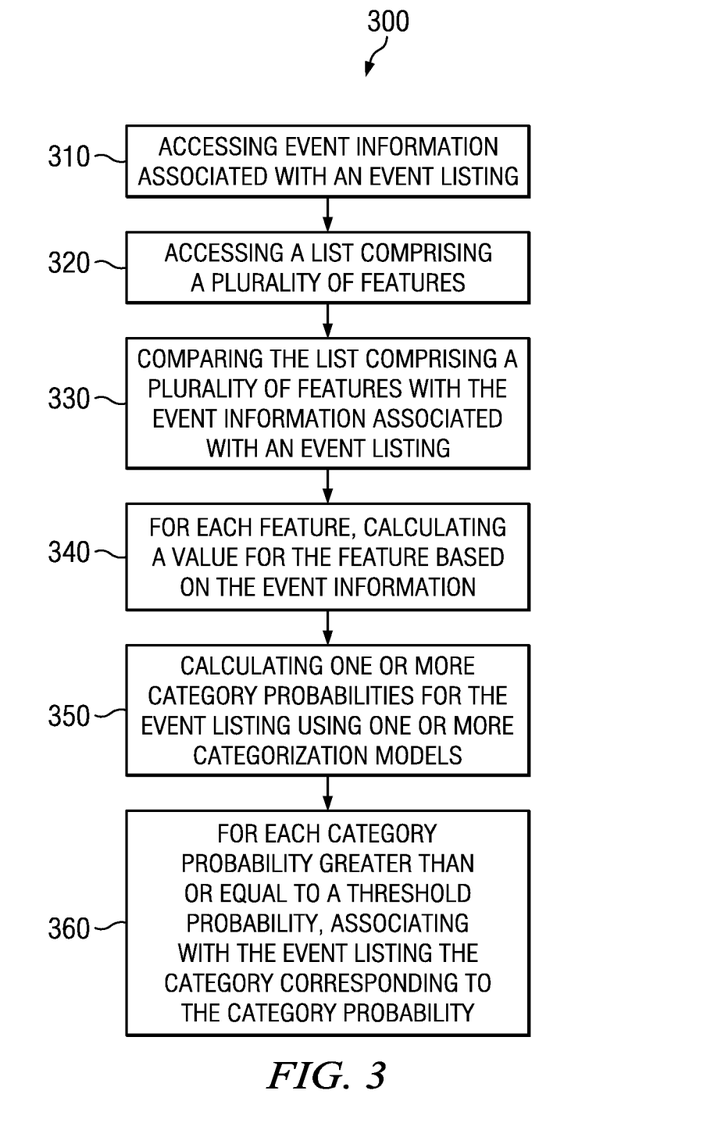
FIG. 3 illustrates an example method for categorizing events.

FIG. 3 illustrates an example method 300 for automatically categorizing event listings in an online event management system. At step 310, an event management system 170 may access event information associated with an event listing. At step 320, an event management system 170 may access a list comprising a plurality of features. At step 330, an event management system 170 may then compare the list comprising a plurality of features to the event information associated with the event listing. At step 340, the event management system 170 may for each feature, calculate a value for the feature based on the event information. At step 350, the event management system 170 may calculate one or more category probabilities for the event listing using one or more categorization models and based at least in part on the event information associated with the event listing. Finally, at step 360, the event management system 170 may for each category probability greater than or equal to a threshold probability, associate with the event listing the category corresponding to the category probability. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Systems and Methods

In particular embodiments, the methods and processes described herein may be implemented as a series of computer-readable instructions, embodied on a data storage medium, that when executed are operable to cause one or more processors to implement particular operations. For smaller datasets, operations may be executed on a single computing platform or node. For larger systems and resulting data sets, parallel computing platforms may be used. As an example and not by way of limitation, development platforms that can leverage Hadoop or other Map-Reduce execution engines may be used. The Apache Software Foundation has developed a collection of programs called Hadoop, which includes a distributed file system and an application programming interface (API) and corresponding implementation of MapReduce. In particular embodiments, system 100 may comprise a high-availability cluster of commodity servers with one or more slave servers as nodes. Ordinarily, nodes in a high-availability cluster are redundant, so that if one node crashes while performing a particular application, the cluster software can restart the application on one or more other nodes. Multiple nodes may also facilitate parallel processing of large databases. In particular embodiments, a master server may receive a job from a client and then assigns tasks resulting from that job to one or more slave servers or nodes, which do the actual work of executing the assigned tasks upon instruction from the master and which move data between tasks. In particular embodiments, the client jobs will invoke Hadoop's MapReduce functionality. Likewise, in particular embodiments, a master server governs a distributed file system that supports parallel processing of large databases. As an example and not by way of limitation, a master server may manage the file system's namespace and block mapping to nodes, as well as client access to files, which are actually stored on slave servers or nodes. In turn, in particular embodiments, the slave servers do the actual work of executing read and write requests from clients and perform block creation, deletion, and replication upon instruction from the master server. Although this disclosure describes using particular computing platforms, this disclosure contemplates using any suitable computing platforms.

Figure 4:
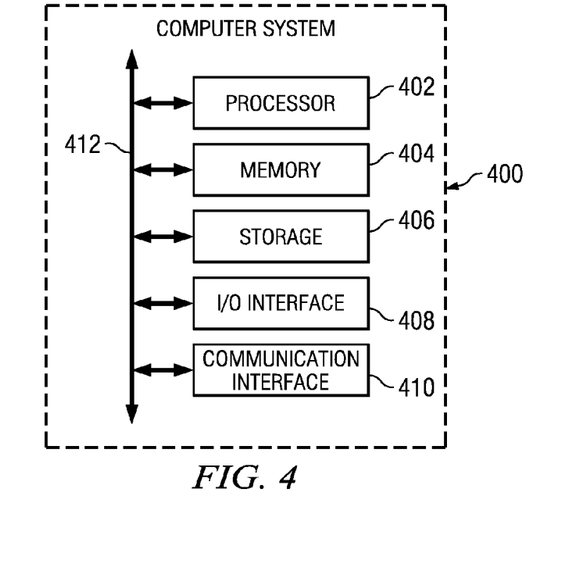
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 308, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 5:
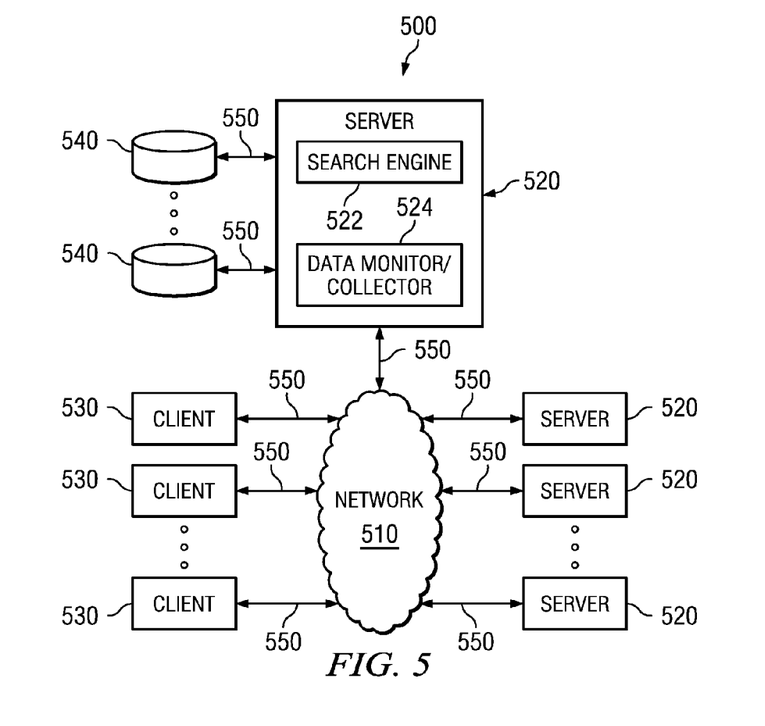
FIG. 5 illustrates an example network environment.

FIG. 5 illustrates an example network environment 500. This disclosure contemplates any suitable network environment 500. As an example and not by way of limitation, although this disclosure describes and illustrates a network environment 500 that implements a client-server model, this disclosure contemplates one or more portions of a network environment 500 being peer-to-peer, where appropriate. Particular embodiments may operate in whole or in part in one or more network environments 500. In particular embodiments, one or more elements of network environment 500 provide functionality described or illustrated herein. Particular embodiments include one or more portions of network environment 500. Network environment 500 includes a network 510 coupling one or more servers 520 and one or more clients 530 to each other. This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 couple servers 520 and clients 530 to network 510 or to each other. This disclsoure contemplates any suitable links 550. As an example and not by way of limitation, one or more links 550 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 550. In particular embodiments, one or more links 550 each includes an intranet, an extranet, a VPN, a LAN, a WLAN, a WAN, a MAN, a communications network, a satellite network, a portion of the Internet, or another link 550 or a combination of two or more such links 550. Links 550 need not necessarily be the same throughout network environment 500. One or more first links 550 may differ in one or more respects from one or more second links 550.

This disclosure contemplates any suitable servers 520. As an example and not by way of limitation, one or more servers 520 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 520 includes hardware, software, or both for providing the functionality of server 520. As an example and not by way of limitation, a server 520 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 530, the web server may communicate one or more such files to client 530. As another example, a server 520 that operates as a mail server may be capable of providing e-mail services to one or more clients 530. As another example, a server 520 that operates as a database server may be capable of providing an interface for interacting with one or more data stores (such as, for example, data stores 540 described below). Where appropriate, a server 520 may include one or more servers 520; be unitary or distributed; span multiple locations; span multiple machines; span multiple datacenters; or reside in a cloud, which may include one or more cloud components in one or more networks.

In particular embodiments, one or more links 550 may couple a server 520 to one or more data stores 540. A data store 540 may store any suitable information, and the contents of a data store 540 may be organized in any suitable manner. As an example and not by way or limitation, the contents of a data store 540 may be stored as a dimensional, flat, hierarchical, network, object-oriented, relational, XML, or other suitable database or a combination or two or more of these. A data store 540 (or a server 520 coupled to it) may include a database-management system or other hardware or software for managing the contents of data store 540. The database-management system may perform read and write operations, delete or erase data, perform data deduplication, query or search the contents of data store 540, or provide other access to data store 540.

In particular embodiments, one or more servers 520 may each include one or more search engines 522. A search engine 522 may include hardware, software, or both for providing the functionality of search engine 522. As an example and not by way of limitation, a search engine 522 may implement one or more search algorithms to identify network resources in response to search queries received at search engine 522, one or more ranking algorithms to rank identified network resources, or one or more summarization algorithms to summarize identified network resources. In particular embodiments, a ranking algorithm implemented by a search engine 522 may use a machine-learned ranking formula, which the ranking algorithm may obtain automatically from a set of training data constructed from pairs of search queries and selected Uniform Resource Locators (URLs), where appropriate.

In particular embodiments, one or more servers 520 may each include one or more data monitors/collectors 524. A data monitor/collection 524 may include hardware, software, or both for providing the functionality of data collector/collector 524. As an example and not by way of limitation, a data monitor/collector 524 at a server 520 may monitor and collect network-traffic data at server 520 and store the network-traffic data in one or more data stores 540. In particular embodiments, server 520 or another device may extract pairs of search queries and selected URLs from the network-traffic data, where appropriate.

This disclosure contemplates any suitable clients 530. A client 530 may enable a user at client 530 to access or otherwise communicate with network 510, servers 520, or other clients 530. As an example and not by way of limitation, a client 530 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 530 may be an electronic device including hardware, software, or both for providing the functionality of client 530. As an example and not by way of limitation, a client 530 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 530 may include one or more clients 530; be unitary or distributed; span multiple locations; span multiple machines; span multiple datacenters; or reside in a cloud, which may include one or more cloud components in one or more networks.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Furthermore, "a", "an," or "the" is intended to mean "one or more," unless expressly indicated otherwise or indicated otherwise by context. Therefore, herein, "an A" or "the A" means "one or more A," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, this disclosure encompasses any suitable combination of one or more features from any example embodiment with one or more features of any other example embodiment herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
   accessing event information associated with an event listing;
   calculating one or more category probabilities for the event listing using one or more categorization models, respectively, each categorization model calculating a category probability based at least in part on the event information associated with the event listing, each category probability corresponding to a category, the category probability being equal to the probability that the event listing falls within the category;
   for each category probability greater than or equal to a threshold probability, associating with the event listing the category corresponding to the category probability; and
   displaying one or more of the categories associated with the event listing to a user.

2. The method of claim 1, wherein each categorization model includes one or more variables based on: a preset list of one or more features; or a list of one or more values of features being associated with the event listing.

3. The method of claim 1, wherein one or more categorization models are refined by one or more learning algorithms, the learning algorithms being logistic regression, binary classification, multiclass classification, or maximum likelihood estimation.

4. The method of claim 1, wherein:
   the event information identifies one or more of: a title of the event; a description of the event; a self-identified category of the event; a derived category of the event; a keyword of the event; an instructions for the event; an attendee of the event; an organizer of the event; a venue of the event; a ticket type of the event; a ticket price of the event; or a geographic location of the event; and
   calculating the one or more category probabilities is further based at least in part on one or more of: the title of the event; the description of the event; the self-identified category of the event; the derived category of the event; the keyword of the event; the instructions for the event; the attendee of the event; the organizer of the event; the venue of the event; the ticket type of the event; the ticket price of the event; or the geographic location of the event.

5. The method of claim 1, wherein the category probability for the event listing is a percentile rank equal to the percentage of event listings that have a category probability the same or lower than the event listing.

6. The method of claim 1, wherein calculating the category probability based at least in part on the event information associated with the event listing comprises:
   accessing a list comprising a plurality of features;
   comparing the list to the event information;
   for each feature present in the event information, calculating a value for the feature; and
   calculating the category probability based at least in part on one or more of the values of the features.

7. The method of claim 6, wherein calculating the category probability based at least in part on the event information associated with the event listing further comprises:
   for each feature not present in the event information, calculating a value of for the feature equal to zero.

8. The method of claim 6, wherein the features present in the event information are represented as a matrix.

9. The method of claim 6, calculating the one or more category C probabilities $f_c(z)$ wherein:

$$f_c(z) = 1/1 + e^{-z};$$

and
   $z = \beta_0 + \beta_1 x_1 + \beta_2 x_2 + \ldots + \beta_k x_k$, wherein z is the result of a comparison between a set of features associated with an event listing and the weights associated with those features, $\beta$ is a factor associated with a particular feature, and x is an indication of a particular feature in the event listing.

10. The method of claim 6, wherein the list comprising a plurality of features is determined by a method comprising:
   accessing D training event informations, each training event information being associated with a training event listing;
   calculating a term frequency for each term i in the D training event informations; and
   for each term i with a term frequency greater than or equal to a threshold term frequency, categorizing the term as a feature.

11. The method of claim 9, wherein the term frequency for each term i in the D training event informations equals (tf-idf)$_{i,j}$, wherein:

$$(tf\text{-}idf)_{i,j} = tf_{i,j} \times idf_i;$$

$$tf_{i,j} = \frac{n_{i,j}}{\sum_k n_{k,j}},$$

wherein tf$_{i,j}$ is the term frequency of term i in document j, n$_{i,j}$ is the number of times term i appears in document j, and k is the total number of terms; and idf$_i$=log |D|/|{d : t$_i \in$d}|, wherein idf$_i$ is the inverse document frequency of term i, and d is the current document.

12. A system comprising: one or more processors; and a memory coupled to the processors comprising instructions executable by the processors, the processors operable when executing the instructions to:
 access event information associated with an event listing;
 calculate one or more category probabilities for the event listing using one or more categorization models, respectively, each categorization model calculating a category probability based at least in part on the event information associated with the event listing, each category probability corresponding to a category, the category probability being equal to the probability that the event listing falls within the category;
 for each category probability greater than or equal to a threshold probability, associate with the event listing the category corresponding to the category probability; and
 display one or more of the categories associated with the event listing to a user.

13. One or more computer-readable non-transitory storage media embodying instructions that are operable when executed to:
 access event information associated with an event listing;
 calculate one or more category probabilities for the event listing using one or more categorization models, respectively, each categorization model calculating a category probability based at least in part on the event information associated with the event listing, each category probability corresponding to a category, the category probability being equal to the probability that the event listing falls within the category;
 for each category probability greater than or equal to a threshold probability, associate with the event listing the category corresponding to the category probability; and
 display one or more of the categories associated with the event listing to a user.

14. The system of claim 12, wherein each categorization model includes one or more variables based on: a preset list of one or more features; or a list of one or more values of features being associated with the event listing.

15. The system of claim 12, wherein one or more categorization models are refined by one or more learning algorithms, the learning algorithms being logistic regression, binary classification, multiclass classification, or maximum likelihood estimation.

16. The system of claim 12, wherein:
 the event information identifies one or more of: a title of the event; a description of the event; a self-identified category of the event; a derived category of the event; a keyword of the event; an instructions for the event; an attendee of the event; an organizer of the event; a venue of the event; a ticket type of the event; a ticket price of the event; or a geographic location of the event; and
 calculating the one or more category probabilities is further based at least in part on one or more of: the title of the event; the description of the event; the self-identified category of the event; the derived category of the event; the keyword of the event; the instructions for the event; the attendee of the event; the organizer of the event; the venue of the event; the ticket type of the event; the ticket price of the event; or the geographic location of the event.

17. The system of claim 12, wherein the category probability for the event listing is a percentile rank equal to the percentage of event listings that have a category probability the same or lower than the event listing.

18. The system of claim 12, wherein to calculate the category probability based at least in part on the event information associated with the event listing comprises executing instructions to:
 access a list comprising a plurality of features;
 compare the list to the event information;
 for each feature present in the event information, calculate a value for the feature; and
 calculate the category probability based at least in part on one or more of the values of the features.

19. The system of claim 18, wherein to calculate the category probability based at least in part on the event information associated with the event listing further comprises:
 for each feature not present in the event information, calculate value of for the feature equal to zero.

20. The system of claim 18, wherein the features present in the event information are represented as a matrix.

* * * * *